US011041549B2

(12) United States Patent
Pfeifer et al.

(10) Patent No.: US 11,041,549 B2
(45) Date of Patent: Jun. 22, 2021

(54) TENSIONING DEVICE

(71) Applicant: Muhr und Bender KG, Attendorn (DE)

(72) Inventors: Simon Pfeifer, Plettenberg (DE); Fabian Stephan, Sundern (DE)

(73) Assignee: Muhr und Bender KG, Attendorn (DE)

( * ) Notice: Subject to any disclaimer, the term of this patent is extended or adjusted under 35 U.S.C. 154(b) by 361 days.

(21) Appl. No.: 16/159,860

(22) Filed: Oct. 15, 2018

(65) Prior Publication Data

US 2019/0120345 A1    Apr. 25, 2019

(30) Foreign Application Priority Data

Oct. 24, 2017 (DE) ...................... 10 2017 124 783.1

(51) Int. Cl.
*F16H 7/14* (2006.01)
*F16H 7/12* (2006.01)
*F16H 7/08* (2006.01)

(52) U.S. Cl.
CPC ............ *F16H 7/14* (2013.01); *F16H 7/1218* (2013.01); *F16H 7/1281* (2013.01); *F16H 2007/0804* (2013.01); *F16H 2007/0806* (2013.01); *F16H 2007/0865* (2013.01); *F16H 2007/0874* (2013.01); *F16H 2007/0893* (2013.01)

(58) Field of Classification Search
CPC ..... F16H 2007/0874; F16H 2007/0893; F16H 2007/0865; F16H 2007/1281; F16H 2007/0806

USPC ........................................................ 474/134
See application file for complete search history.

(56) References Cited

U.S. PATENT DOCUMENTS

| | | | | |
|---|---|---|---|---|
| 1,848,423 | A * | 3/1932 | Jackson | D01H 1/241 474/134 |
| 6,406,393 | B1 * | 6/2002 | Chen | F16H 7/1281 474/101 |
| 6,648,783 | B1 * | 11/2003 | Bogner | F16H 7/1281 474/134 |

(Continued)

FOREIGN PATENT DOCUMENTS

| | | |
|---|---|---|
| DE | 198 49 886 A1 | 5/2000 |
| DE | 10 2014 117 094 A1 | 5/2016 |

(Continued)

*Primary Examiner* — Henry Y Liu
(74) *Attorney, Agent, or Firm* — Bejin Bieneman PLC

(57) ABSTRACT

A tensioning device for tensioning a traction mechanism of a belt drive comprises a base member; a first tensioning arm pivotably supported on the base member and carrying a first tensioning roller; a second tensioning arm pivotably supported on the base member and carrying a second tensioning roller; a spring arrangement with first and second springs arranged to be effective between the first and second tensioning arms; wherein the two tensioning arms, when being pivoted relative to each other within a first tensioning angle range, are force-loaded against each other by the first spring, wherein the second spring is force-free relative at least to one of the tensioning arms; and wherein the tensioning arms, when being pivoted relative to each other within a second tensioning angle range comprising larger tensioning angles than the first tensioning angle range, are force-loaded against each other by the first spring and the second spring.

15 Claims, 4 Drawing Sheets

(56) References Cited

U.S. PATENT DOCUMENTS

| | | | | |
|---|---|---|---|---|
| 6,689,001 B2* | 2/2004 | Oliver | F16H 7/1281 | 474/134 |
| 6,699,148 B1* | 3/2004 | Taylor | B65G 19/02 | 474/109 |
| 7,530,911 B2* | 5/2009 | Serkh | F16H 7/1218 | 474/133 |
| 7,892,125 B2* | 2/2011 | Nelson | F16H 7/1254 | 474/134 |
| 7,901,310 B2* | 3/2011 | Lolli | F16H 7/1281 | 474/134 |
| 8,821,328 B2* | 9/2014 | Jud | F16H 7/1281 | 474/134 |
| 9,890,837 B1* | 2/2018 | Martinez | F16H 7/0831 | |
| 10,920,860 B2* | 2/2021 | Stadermann | F16H 7/12 | |
| 2002/0039944 A1* | 4/2002 | Ali | F16H 7/1218 | 474/135 |
| 2003/0109342 A1* | 6/2003 | Oliver | F16H 7/1281 | 474/134 |
| 2003/0216203 A1* | 11/2003 | Oliver | F16H 7/1281 | 474/134 |
| 2004/0072642 A1* | 4/2004 | Serkh | F16H 7/1218 | 474/134 |
| 2006/0217222 A1* | 9/2006 | Lolli | F02B 67/06 | 474/134 |
| 2006/0287146 A1* | 12/2006 | McVicar | F16H 7/1281 | 474/109 |
| 2009/0186726 A1* | 7/2009 | Van Maanen | F16H 7/1281 | 474/110 |
| 2009/0239693 A1* | 9/2009 | Ruffini | F16H 7/1281 | 474/112 |
| 2011/0070986 A1* | 3/2011 | Maguire | F02B 67/06 | 474/135 |
| 2013/0203535 A1* | 8/2013 | Mack | F16H 7/129 | 474/134 |
| 2014/0256488 A1* | 9/2014 | Wolf | F16H 7/12 | 474/135 |
| 2014/0342862 A1* | 11/2014 | Wolf | F16H 7/1218 | 474/117 |
| 2015/0219189 A1* | 8/2015 | Serkh | F16H 7/1281 | 474/112 |
| 2015/0308545 A1* | 10/2015 | Harvey | F02B 67/06 | 474/117 |
| 2016/0146312 A1* | 5/2016 | Pfeifer | F16H 7/08 | 474/135 |
| 2016/0273622 A1* | 9/2016 | Kim | F16H 7/1209 | |
| 2017/0037940 A1* | 2/2017 | Serkh | F16H 7/1281 | |
| 2017/0146100 A1* | 5/2017 | Walter | F02B 67/06 | |
| 2017/0306836 A1* | 10/2017 | Replete | F02B 67/06 | |
| 2018/0017143 A1* | 1/2018 | Antchak | B60K 25/02 | |
| 2019/0017579 A1* | 1/2019 | Stadermann | F16H 7/1281 | |
| 2020/0072323 A1* | 3/2020 | Montani | F16H 7/12 | |

FOREIGN PATENT DOCUMENTS

| | | |
|---|---|---|
| EP | 2128489 A2 | 12/2009 |
| FR | 2781008 A1 | 1/2000 |
| WO | 2013087467 A1 | 6/2013 |
| WO | 2014100894 A1 | 7/2014 |
| WO | 2017147251 A1 | 8/2017 |

* cited by examiner

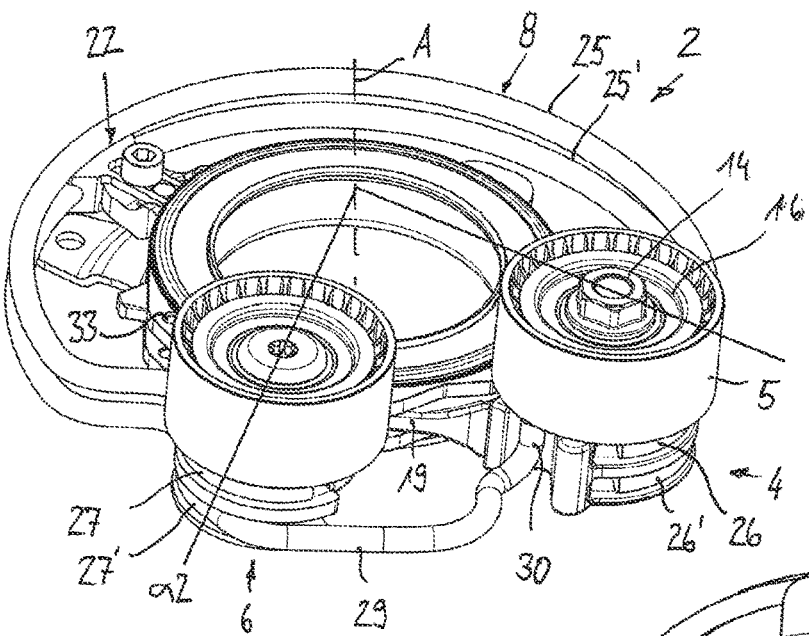

TENSIONING DEVICE

CROSS-REFERENCE TO RELATED APPLICATIONS

This application claims priority to German Application No. DE 10 2017 124 783.1, filed on Oct. 24, 2017, which application is hereby incorporated herein by reference in its entirety.

BACKGROUND

A traction drive, e.g., a belt or chain drive, generally comprises an endless traction mechanism, e.g. a belt or chain, and at least two drive pulleys, of which one can act as a drive and one as an output of the traction drive. Such traction drives are used for example on combustion engines of a motor vehicle for driving accessories, wherein a first drive pulley is connected to the crankshaft of the combustion engine and drives the traction mechanism. Further drive pulleys are assigned to accessories, like for example water pump, alternator or air conditioning compressor, and are driven rotatably by the traction drive. In typical traction drives the accessories are designed as loads, i.e., they are driven by the drive pulley of the crankshaft via the traction mechanism. An undriven portion (slack side) of the traction mechanism is formed between the crankshaft and the accessory adjoining the crankshaft in direction of rotation of the traction mechanism, said adjoining accessory typically being a generator. To ensure a sufficient wrap of the traction mechanism around the drive pulley, the traction mechanism is pretensioned by a tensioning roller of the tensioning device.

From EP 2 128 489 A2 a belt tensioning device for a belt drive with a starter-generator is known. The belt tensioning device has a housing, in which two tensioning arms are pivotably supported around a pivot axis. The tensioning arms are supported against each other by spring means.

From WO 2014/100894 A1 a belt tensioning device is known with a base member, a first tensioning arm, supported rotatably thereon, as well as a second tensioning arm pivotably supported on the first tensioning arm. A damping structure is provided, to dampen the first tensioning arm relative to the base member. In an embodiment, the damping structure comprises a Belleville spring that is arranged between the first tensioning arm and the base member with axial pre-tension. In another embodiment a first and a second annular sleeve are provided, which are axially pre-tensioned, to dampen a rotational movement of the first tensioning arm relative to the housing.

Traction drives in the form of belt drives for a motor vehicle need, depending on the driving condition (partial load, full load, start, boost, recovery or regeneration of energy, coasting, and so on), different strand forces, to prevent belt slippage. This applies in particular for belt drives in hybrid vehicles with a starter-generator-function. In today's belt drives the necessary minimum value of strand forces of all driving cycles is applied onto the belt at any time, which overall leads to a high churning work on the belt.

SUMMARY

The present disclosure relates to a tensioning device for a traction drive, in particular with a traction driven starter-generator. The tensioning device for the traction drive provides for the lowest possible strand forces of the traction drive and thus leads to a higher efficiency or lower losses.

A tensioning device for tensioning a traction mechanism of a traction drive comprises a base member; a first tensioning arm pivotably supported on the base member and having a first tensioning roller; a second tensioning arm pivotably supported on the base member and having a second tensioning roller; a spring arrangement with a first spring and a second spring that are arranged to be effective between the first and the second tensioning arm; wherein the two tensioning arms, when being pivoted relative to each other within a first tensioning angle range, are force-loaded against each other by the first spring, wherein the second spring is force-free relative to at least one of the two tensioning arms; wherein the two tensioning arms, when being pivoted relative to each other within a second tensioning angle range comprising larger tensioning angles than the first tensioning angle range, are force-loaded against each other by the first spring and additionally by the second spring.

The tensioning device can be used, for example, for belt drives of motor vehicles, but can also be used for other traction drives. An advantage of the tensioning device is that the nominal tensioning force of the tensioning device can be designed to be as small as possible. The nominal tensioning force is defined by the first spring that alone is effective between the first and the second tensioning arm in a first tensioning angle range. Only at larger tensioning angles, which can occur in special driving conditions such as for example switching-on an electric drive (boost) or recovery or regeneration of mechanical energy into electrical energy, the second spring is activated and generates an additional tensioning force between the two tensioning arms. Depending on the deflection angle between the two tensioning arms, a smaller tensioning force is exerted only by the first spring, or a larger tensioning force is exerted by the first and the second spring onto the tensioning rollers and thus onto the tensioning means. The spring preload can be directly increased by the tensioning system depending on the roller position, the position of the tensioning arms and/or the driving conditions, in order to prevent slippage of the tensioning means.

A second angle can be defined between the first tensioning angle range and the second tensioning angle range, at which second angle a resulting spring force acting on the tensioning arms increases abruptly. In the first tensioning angle range, which includes the tensioning angles in the nominal position and/or in normal operation, only the first spring of the spring arrangement is active. When reaching the second angle above nominal position, the second spring is taken along by the second tensioning arm, so that a higher tensioning force and respectively a higher strand force is induced. The second angle can also be referred to as a catching- or engagement angle.

In the balance, i.e., equilibrium, condition, a first tensioning angle is enclosed between the first tensioning arm and the second tensioning arm, which can also be referred to as a balance-tension-angle or equilibrium-tension-angle. The equilibrium condition is understood in particular as a condition that the tensioning arms assume in the installed state of the tensioning device in the belt drive with the belt being put on, without any further force application. During normal operation, i.e., in the static operation condition of the belt drive, the tensioning arms take up a normal operating position, in which a normal-operation-tension-angle is enclosed between the tensioning arms. The first tensioning angle (equilibrium angle) and the normal operation angle, are arranged within the first tensioning angle range. The second tensioning angle (engagement angle), and thus the start of the second tensioning angle range, can be adjusted in particular such that it is smaller than the sum of the first tensioning angle plus 20°, preferably smaller than the first tensioning angle plus 15°. It is particularly advantageous if the second tensioning angle is as close as possible behind the normal operation angle, in particular at most 10°, preferably at most 5° above normal operation angle. The specified angles relate to the angles, which one tensioning arm encloses with the other tensioning arm, respectively which at least one of the tensioning arms moves around the axis of rotation.

The second spring can be installed with spring preload, which in particular already applies for the first tensioning angle range. In this manner, when the second tensioning angle range is reached, the second spring is already on a higher force level, so that the tensioning forces and thus the strand forces are correspondingly increased. At the largest tensioning angle of the first tensioning angle range the first spring generates a first spring force between the two tensioning arms, and at the smallest tensioning angle of the second tensioning angle range the second spring generates an additional a second spring force between the two tensioning arms. The second spring force is added to the first spring force, so that the resulting spring force acting on the tensioning arms and thus also the resulting spring torque is overall increased. The force level to be effective as from reaching the second tensioning angle range can be adjusted by correspondingly configuring the second spring. For example, the force generated by the second spring can be greater than a third of the first spring force, in particular greater than half of the first spring force, or if applicable can even correspond to or be greater than the spring force of the first spring.

According to a possible embodiment, adjustment means can be provided for adjusting the first tensioning angle range, respectively the second tensioning angle. With the adjustment means the angle range can be adjusted up to which only the first spring is effective, i.e., from which angle the second spring is activated. The adjustment means can for example be designed in the form of screw means with which the support of the second spring can be adjusted relative to the first tensioning arm.

According to an embodiment, the first spring is supported with a first spring end against the first tensioning arm and with a second spring end against the second tensioning arm. When the tensioning arms are pivoted relative to each other due to occurring or changing strand forces, the spring is expanded and loads the two tensioning arms towards each other. The first spring can be formed mirror-symmetrically in an axial view, which can also apply for the second spring at least for a spring portion.

The design and arrangement of the second spring can be adapted according to the technical requirements and installation space conditions, wherein different embodiments are possible. For example, two springs with the same spring characteristic can be used, of which the spring force of one spring is sufficient to statically tension the belt slip-free under consideration of all accessory-, belt- and spring-tolerances. As an alternative, also several different strong springs can be used, and by means of their parallel arrangement the respectively appropriate strand force is provided for each critical driving condition.

According to a first possibility, the second spring is formed similarly to the first spring, meaning in particular that the bending portions of the first and the second spring, extending between the two support portions, have a comparable length and/or a comparable course. The second spring can be supported with a first spring end against the first tensioning arm in a first rotational direction. The opposite second spring end is, at tensioning angles within the first tensioning angle range, supported in the opposite second rotational direction against the first tensioning arm, too, so that the second spring exerts no force onto the second tensioning arm at pivot movements within the first tensioning angle range. At larger deflections of the two tensioning arms relative to each other reaching into the second tensioning angle range, the second spring comes into supporting contact with the second tensioning arm. Thereby, the second spring is taken along by the second tensioning arm in the second rotational direction, so that the second spring end lifts off from the first tensioning arm. For this, the second spring can have a formed support portion, which is contact-free relative to the second tensioning arm during pivot movements within the first tensioning angle range, and which is supported against the second tensioning arm in a rotational direction at pivot movements in the adjoining second tensioning angle range, and is loaded by same. The second spring can have a formed guide portion between the second spring end and the second support portion, which can interact with a guide element of the second tensioning arm when the two tensioning arms are pivoted within the first tensioning angle range. The guide portion is in particular formed such that the second spring is axially supported and guided on the guide element of the tensioning arm, respectively. The second spring end of the second spring is at least indirectly supported against the first tensioning arm in a rotational direction for smaller angles enclosed by the two tensioning arms, and lifts off from the support at larger angles. In order to avoid a undesired noise when springing back and contacting the first tensioning arm again, damping means can be provided. The damping means are configured to dampen an abutment movement of the second spring end against the first tensioning arm. For example, the damping means can be configured in the form of a buffer block or a sleeve with integrated elastic element. According to an embodiment the damping means for damping an abutment movement and the adjustment means for adjusting the activation angle for the second spring can be integrally designed as an adjustment-damping-device.

According to a second possibility, the second spring can be accommodated in a telescope-retainer, which is arranged to be effective between the two tensioning arms. The unit formed by the spring and the telescope-retainer can also be referred to as a telescope-spring-unit. In particular it is provided that the first end of the telescope-retainer is pivotably supported on the first tensioning arm and that the second end of the telescope-retainer is pivotably supported on the second tensioning arm. The spring is installed with pretension in the retainer in such a way that the spring is force-free in relation to a support of the two tensioning arms in a first telescope travel range, which corresponds to the first pivoting angle range, and from the pretensioned position is further loaded in a second telescope travel range, which corresponds to the second pivot angle range of the tensioning arms, so that the second spring exerts a spring force between the two tensioning arms. In particular, it is provided that the telescope-retainer comprises a first part and a second part which are telescopic relative to each other, wherein a first end of the second spring is axially supported against the first part of the telescope-retainer, and a second end of the second spring is axially supportable on the second part of the telescope-retainer.

The first spring can, for example, be in the form of a bow-shaped spring which, when installed, can have a circumferential extension around the pivot axes of the tensioning arms of less than 360°, in particular less than 330°. The bow spring has a support portion at each end respectively, with which the spring is supported on the respective tensioning arm in a circumferential direction in order to load the two tensioning arms against each other. The support portions can be arch-shaped, i.e., curved, and rest in a corresponding circumferential groove on the respective tensioning arm, so that the first spring is fixed in axial direction and in circumferential direction by being mounted in the two circumferential grooves of the two tensioning arms. Between the two support portions, a spring portion is provided in which potential energy is stored during elastic expansion of the spring. When the spring is elastically expanded, the spring portion which can also be referred to as a C-shaped portion or bow portion is mainly subjected to bending, which is why the spring can also be referred to as bending spring. The spring portion extends between the two end portions substantially arc-like in a circumferential direction around a spring axis, which in the installed condition is approximately close to and/or essentially parallel to the pivot axis of the two tensioning arms. An average radius of the spring portion is larger than a radius of an annular part of the tensioning device enclosing the opening, so that a radial gap is formed between the annular part and the spring portion. In the relaxed condition, the spring can have an average radius that is smaller than an axis distance between a pivot axis of the tensioning arms and a rotational axis of the tensioning roller. In the installed condition, the bow spring can have an average radius, which is larger than the axis distance between the pivot axis and the rotational axis. The tensioning angle enclosed between the two tensioning arms depends on the individual installation condition on the accessory and can be smaller than 90° in the mounted condition. The first and/or the second spring can be manufactured from round wire or rectangular wire. As described above, the second spring can be formed between the two support portions correspondingly to the first spring.

The base member can have an opening that is configured such that a drive shaft and/or belt drive pulley of an accessory, i.e., unit, can extend contact-free into the opening. The base member can have an attachment portion for attaching the belt tensioning device to a stationary component, for example the accessory or the motor housing. According to an exemplary embodiment, the attachment portion can project flange-like from an annular portion through which the drive shaft is passed. It is advantageous if the attachment portion has several attachment points, at which the base member can be connected to the accessory, i.e., unit. The base member can be made for instance from a metal material, for example as a light metal cast component or in the form of a sheet metal part made from steel sheet, wherein the production from plastics, especially fibre-reinforced plastics, is also possible. The first and/or second tensioning arm can be made from a metal material, in particular a steel material or a light metal casting, wherein the production from plastics, in particular fibre-reinforced plastics, is also possible in this case.

According to a first possibility the tensioning device is formed such that the bearings of the tensioning arms are arranged in the area between the attachment portion of the base member and the belt plane. This also applies for the spring arrangement, which preloads the tensioning arms against each other, which is also arranged between the middle plane of the belt and the attachment portion. The belt plane corresponds approximately to the bearing center plane, which is defined by the bearings of the tensioning rollers on the tensioning arms. A further bearing center plane is formed by the bearings of the tensioning arms on the base member.

According to a second possibility the belt tensioning device can be designed such that the tensioning arms are supported on the base member behind the belt plane when viewed from the accessory, i.e., unit. This means that the center plane of a tensioning arm bearing is arranged axially off-set relative to the center plane of the belt in direction away from the accessory. In this case, the second bearing center plane and the attachment means for attaching the base member are arranged on different sides of the first bearing center plane of the tensioning rollers.

The tensioning device can be used for a belt drive, which has at least one accessory with a drive shaft and a belt pulley as well as an endless belt for driving the belt pulley. In particular, the tensioning device is formed such that the two pivot axes of the tensioning arms are arranged within the opening of the housing. In the installed condition of the belt tensioning device on the accessory, i.e., unit, the two pivot axes are arranged preferably within the largest outer diameter of the belt pulley and/or the drive shaft, in particular coaxially thereto. The two pivot axes can be arranged coaxially to each other, i.e. form a common pivot axis, or be off-set relative to each other.

SUMMARY OF THE DRAWINGS

Example embodiments are described in the following using the drawings which show:

FIG. 4A: an example belt tensioning device in a third embodiment in a first perspective view from semi-oblique front in the angle position in which the second spring is activated;

FIG. 4B: the belt tensioning device of FIG. 4A with a tensioning roller removed from the first tensioning arm;

FIG. 4C: the belt tensioning device of FIG. 4A in a further perspective view from below;

DESCRIPTION

Figure 1A:
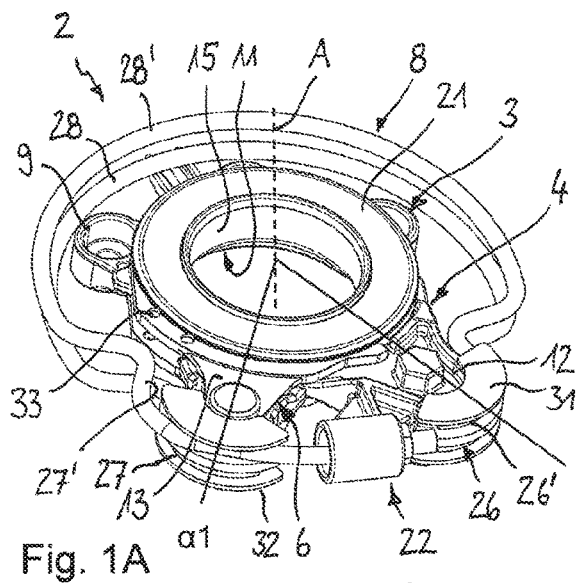
FIG. 1A: an example belt tensioning device in a first embodiment in a first perspective view in a first angle position within the first tensioning angle range.
Figure 1B:
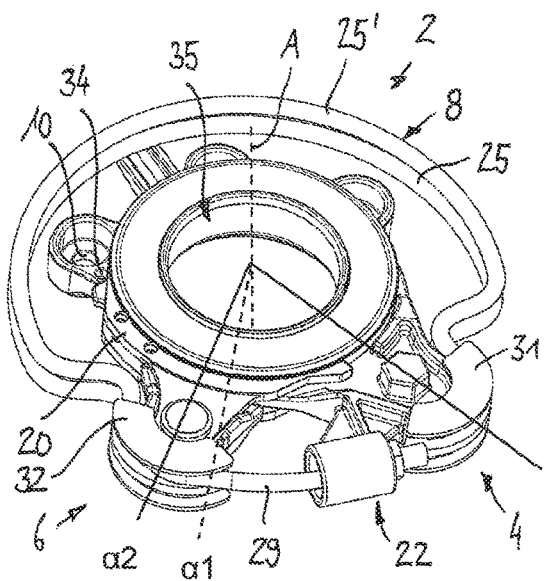
FIG. 1B: the belt tensioning device of FIG. 1A in a second angle position, in which the second spring is activated.
Figure 1C:
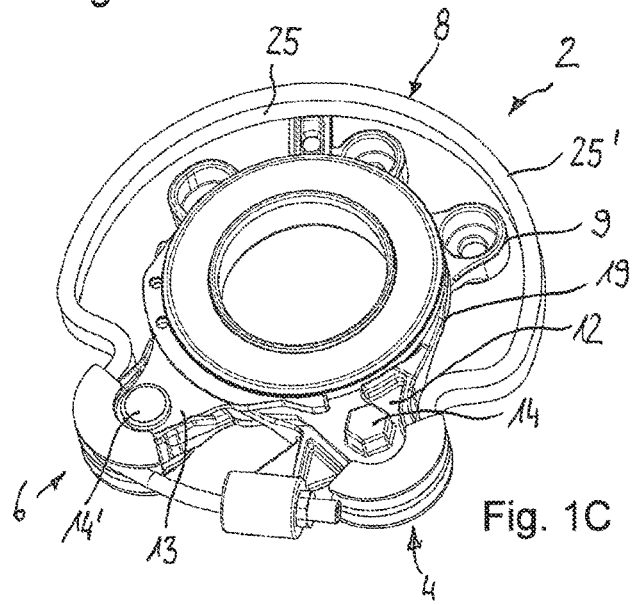
FIG. 1C: the belt tensioning device in the angle position shown in FIG. 1B in a further perspective view.
Figure 2:
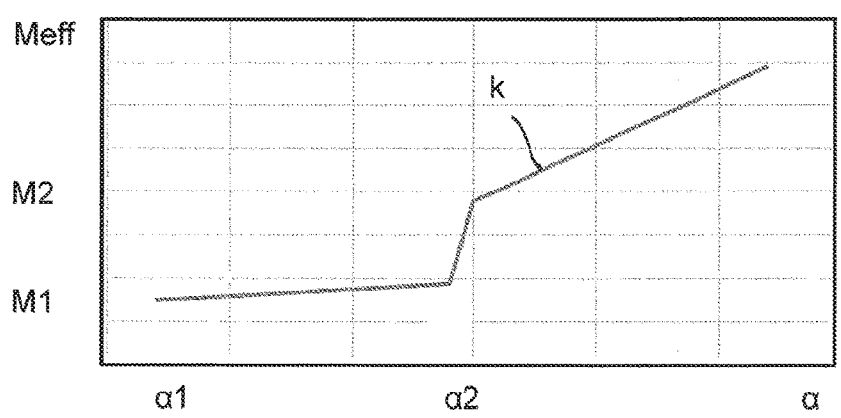
FIG. 2: a moment-angle-diagram of the effective tensioning moment Meff across the tensioning angle α.

FIGS. 1A to 1C, which are jointly described together with FIG. 2 below, show a belt tensioning device 2 in a first embodiment. The belt tensioning device 2 comprises a base member 3, a first tensioning arm 4, a second tensioning arm 6 and a spring arrangement 8, via which the two tensioning arms 4, 6 are spring-loaded against each other in the direction of rotation. Each of the two tensioning arms 4, 6 carries an associated tensioning roller, which is respectively supported on the tensioning arm so as to be rotatable around a respective axis of rotation. For simplification, the tensioning rollers are not shown in the present embodiment.

The base member 3 can be attached to a stationary component like an accessory, that can also be referred to as unit. In principle, the accessory can be any machine which is part of the belt drive, i.e., especially any of the auxiliary units driven by the main engine of the motor vehicle such as generator, water pump or the like. For connection to the stationary component, the base member 3 has several attachment portions 9, which are designed in the form of radially outwardly projecting flange projections with bores 10, through which screws can be inserted for attaching to the stationary component. The tensioning arms 4, 6 are rotatably supported on the base member 3. For example, it can be provided that the first tensioning arm 4 is pivotably supported by a first bearing around a first pivot axis, and the second tensioning arm 6 is pivotably supported by a second bearing around a second pivot axis. In this embodiment, the two tensioning arms 4, 6 are arranged coaxially to each other, i.e. the two individual pivot axes coincide. Generally, however, it is also possible for certain applications that the two pivot axes can be arranged parallel or eccentrically to each other.

The base member 3 has an annular portion 11, on which the two tensioning arms 4, 6 are at least indirectly axially supported, and a sleeve portion 15, on which the first and/or the second tensioning arm 4, 6 are radially supported. At the free axial end of the sleeve portion 15, an annular disc 21 is fixed as a closure. In the present case, this is achieved by flanging down an end-sided edge of the sleeve portion 15, wherein other fastening methods are also possible. The annular disc 21 forms a support face to axially support the first and/or the second tensioning arm 4, 6 in the opposite axial direction to the annular portion 11. Jointly, the annular disc 21, the sleeve portion 15 and the annular portion 11 form an approximately C-like receptacle for the two tensioning arms 4, 6 in a half-longitudinal section.

In the present embodiment, the base member 3, the first tensioning arm 4 and the second tensioning arm 6 are formed as casting components from a metal material, like for example die casting from a light metal, wherein also other embodiments from steel or plastics are possible.

The spring arrangement 8 extending in a circumferential direction around the pivot axis A counteracts a relative pivot movement of the two tensioning arms 4, 6. The two tensioning arms 4, 6 are rotatable relative to each other to a limited extent due to the functionally interposed spring arrangement 8 and, together with the spring arrangement 8, are freely rotatable relative to the base member 3 around the axis A, i.e. around 360° and more. When mounted on the stationary component, this free rotation is only possible to the extent permitted by the installation condition. It is provided that the pivot axis A is arranged within an opening 35 of the base member 3.

The tensioning arms 4, 6 each have a carrier portion 12, 13 which projects radially outwardly from an annular portion 19, 20 of the respective tensioning arm 4, 6. A respective tensioning roller 5, 7 is attached to each carrier portion 12, 13 and is rotatingly supported by a corresponding bearing around an axis of rotation parallel to the pivot axis A. The roller bearings are each connected to the respective carrier portion 12, 13 by screw means 14, 14'.

In the following, the spring arrangement 8 of the tensioning device 2 is described in more detail.

The spring arrangement 8 comprises a first spring 25 and a second spring 25', which are arranged in particular in functional parallel arrangement between the first and the second tensioning arm. The first spring 25 is supported in a circumferential direction with the first spring end 26 against the first tensioning arm 4, and with its opposite second spring end 27 against the second tensioning arm 6. Between the two tensioning arms 4, 6 a tensioning angle α is enclosed, which changes according to the tensioning forces acting on the tensioning rollers from the belt. If the tensioning arms 4, 6 are rotated relative to each other due to occurring or changing strand forces, the spring 25 is expanded and loads the two tensioning arms 4, 6 towards each other.

In the equilibrium state and/or at nominal load, a first tensioning angle α1 is defined between the tensioning arms 4, 6. The second spring 25' is designed and mounted such that the two tensioning arms 4, 6 in the state of equilibrium or at nominal load in a range around the first tensioning angle (α1), are force-loaded against each other only by the first spring 25, while the second spring 25' exerts no force between the tensioning arms 4, 6, i.e. is support-free relative to the second tensioning arm 6. This applies to relative rotational movements of the two tensioning arms 4, 6 within a first tensioning angle range (α<α2).

When pivoting the two tensioning arms 4, 6 towards larger tensioning angle ranges (α>α2), the second spring 25' is activated so that in this second tensioning angle range the tensioning arms 4, 6 are force-loaded against each other by the first spring 25 and additionally by the second spring 25'. Accordingly, the effective spring torque Meff increases from a low torque M1, which is effective within the first tensioning angle range (α<α2), abruptly, i.e. rapidly to a larger torque M2, which is effective within the second tensioning angle range (α>α2). This fact can be seen from the diagram shown in FIG. 2, which shows the resulting spring characteristic k over the tensioning angle α.

Figure 1D:
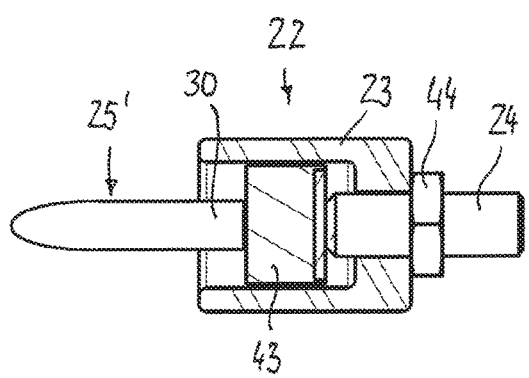
FIG. 1D: the adjustment means of FIGS. 1A to 1C as a detail in a longitudinal sectional view.

To adjust the angle α2, at which the spring torque M increases, corresponding adjustment means 22 are provided, which can also be referred to as adjustment unit. The adjustment means 22 shown in detail in FIG. 1D comprise a sleeve body 23 that is rigidly connected to the first tensioning arm 4, an adjustment element 24 that is displaceable relative to the sleeve body 23, and a support body 43 that is moveable by the adjustment element 24 and against which the spring end 30 of the second spring 25' is supportable. The spring end 30 can be made to abut the support body 43 which can thus also be referred to as abutment body. In the present embodiment, the adjustment element 24 is formed as a screw that is screwed into a threaded bore of the sleeve body 23 and is secured by a locking nut 44 against unintentional rotation. The spring-sided end of the adjustment element 24 is connected to the support body 43 for joint movement, for example by means of a screw- and/or latching-connection or other engagement. When the second tensioning arm 6 is arranged within the first tensioning angle range (α<α2) relative to the first tensioning arm 4, the spring end 30 is arranged in the sleeve 23 and is supported against the support body 43 and thus the first tensioning arm 4 in a circumferential direction. By the adjustment means 24, the second angle α2 can be set, i.e., the angle range up to which only the first spring 25 is active and from which the second spring 25' is additionally activated. Thus, manufacturing tolerances of the tensioning device 2 as well as general tolerances in the belt drive, like positional tolerances of the accessories or length tolerances of the belt, can be adjusted.

Damping means are provided to avoid unwanted noise development when springing back again and coming into contact with the first tensioning arm 4. The damping means are presently designed integrally with the support body 43. This is achieved in that the support body 43 is configured as an elastic body, so that it simultaneously has damping function when the spring end 30 strikes against the support body.

The first spring 25 is formed as a bow spring, which is supported with a first support portion 26 on the first tensioning arm 4, and with a second support portion 27 on the second tensioning arm 6, in a circumferential direction. The support portions 26, 27 form the ends of the bow spring 25 and thus can also be referred to as end portions. The end portions are formed arc-like and engage in corresponding circumferential grooves of a respective support element 31, 32 connected to the corresponding tensioning arm 4, 6. The support elements 31, 32 are each connected to the corresponding carrier portion 12, 13 of the tensioning arm 4, 6, for example by being molded thereon or mounted thereon. By the form-locking engagement of the end portions 26, 27 in the associated support elements 31, 32, the bow spring 25 is fixed in axial direction and in circumferential direction. Between the two support portions 26, 27, the free spring portion 28 of the bow spring 25 extends in which, during expansion of the spring, potential energy is stored. The bow spring 25 is formed so as to be mirror-symmetrical relative to a center plane extending between the two end portions. The bow spring 25 has a circumferential extension of less than 360° around the pivot axis A. In this case, a mean radius of the spring portion 28 of the bow spring 25 is larger than the largest radius of the annular portions 19, 20 of the two tensioning arms 4, 6.

In the present embodiment, the second spring 25' is also designed as a bow spring and corresponds, concerning its shape, essentially to the first spring 25. A difference to the first spring 25 is only that the second spring 25' projects beyond the second support portion 27' in a circumferential direction towards the first tensioning arm 4. Within the first tensioning angle range (α<α2), the second spring end 30 of the second spring 25' is supported on the abutment body 24 of the adjustment means 23. When spreading the two tensioning arm 4, 6 and when reaching the second tensioning angle (α=α2), the second support portion 27' abuts the support element 32 and is carried along by the second tensioning arm 6 as the tensioning angle increases further, whereby the second spring 25' is expanded. Between the second support portion 27' and the free spring end 30, the second spring 25' has a guide portion 29, which interacts in a guiding manner with the support element 32 during pivoting of the tensioning arms 4, 6 within the first tensioning angle range (α<α2). The guide portion 29 is formed such that the second spring 25' is axially supported and/or guided on the support element 32 of the second tensioning arm 6 during a relative movement towards the second tensioning arm 6. In the present case, the support elements 31, 32 are configured in the form of plastic bearing shells, injection moulded to the respective tensioning arm 4, 6, wherein other supports are also possible.

The bow springs 25, 25' are under strong pressure pretension in the circumferential direction in the installed condition, i.e., the springs are expanded relative to their relaxed condition, wherein the first spring 25 loads the two tensioning arms 4, 6 in a direction towards each other. To (temporarily) fix the pretensioned position, the tensioning arms 4, 6 are moved against the pretensioning force of the springs away from each other and a securing pin is inserted into a first bore 33 in the first tensioning arm 4 and a second bore 34 in the second tensioning arm 6. After the mounting of the belt tensioning device 2 on the accessory and putting the belt on, the securing pin is pulled out, so that the tensioning arms 4, 6 are loaded by the bow springs 25, 25' in a circumferential direction towards each other. In nominal operation, the second bow spring 25' is supported on the first tensioning arm 4 in circumferential direction and produces no tensioning effect onto the tensioning rollers, while the first spring 25 pretensions the tensioning rollers 5, 7, and thus the belt.

In a modified embodiment not illustrated, the first and/or the second spring 25, 25' can be formed such that an axial total length of the spring arrangement 8 is larger than the axial length of the spring arrangement 8 in the area of the tensioning rollers 4, 6 or in the region of the support portions 26, 27. This can, for example, be achieved such that a section of the spring portion 28 arranged opposite to the tensioning rollers 5, 7, is axially offset relative to the first and second support portion 26, 27 in a direction away from the attachment portion 9 of the base member 3. For this, the spring portion 28 between the two support portions 26, 27 can have an axial gradient component with respect to the pivot axis A. In this way it is achieved that the spring portion 28 has a larger axial distance with respect to neighbouring components and is contact-free relative thereto even when vibrations occur.

Figure 3A:
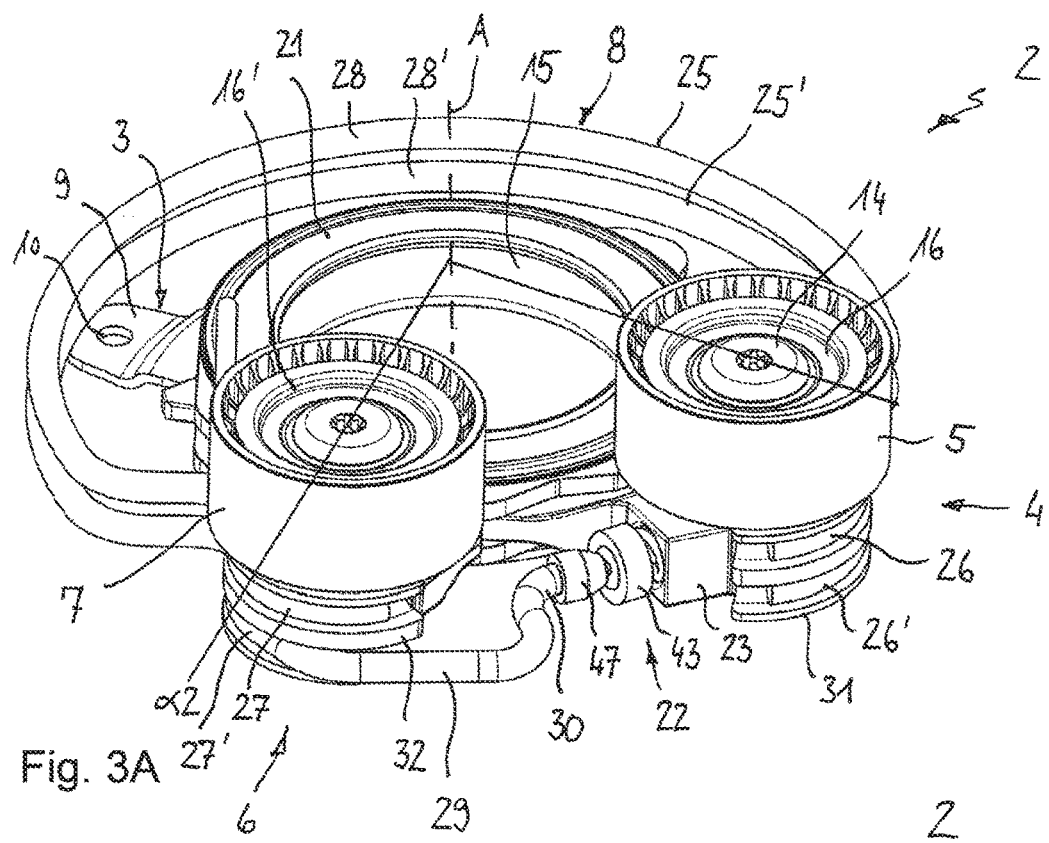
FIG. 3A: an example belt tensioning device in a second embodiment in a first perspective view from a semi-oblique front in the angle position in which the second spring is activated.
Figure 3B:
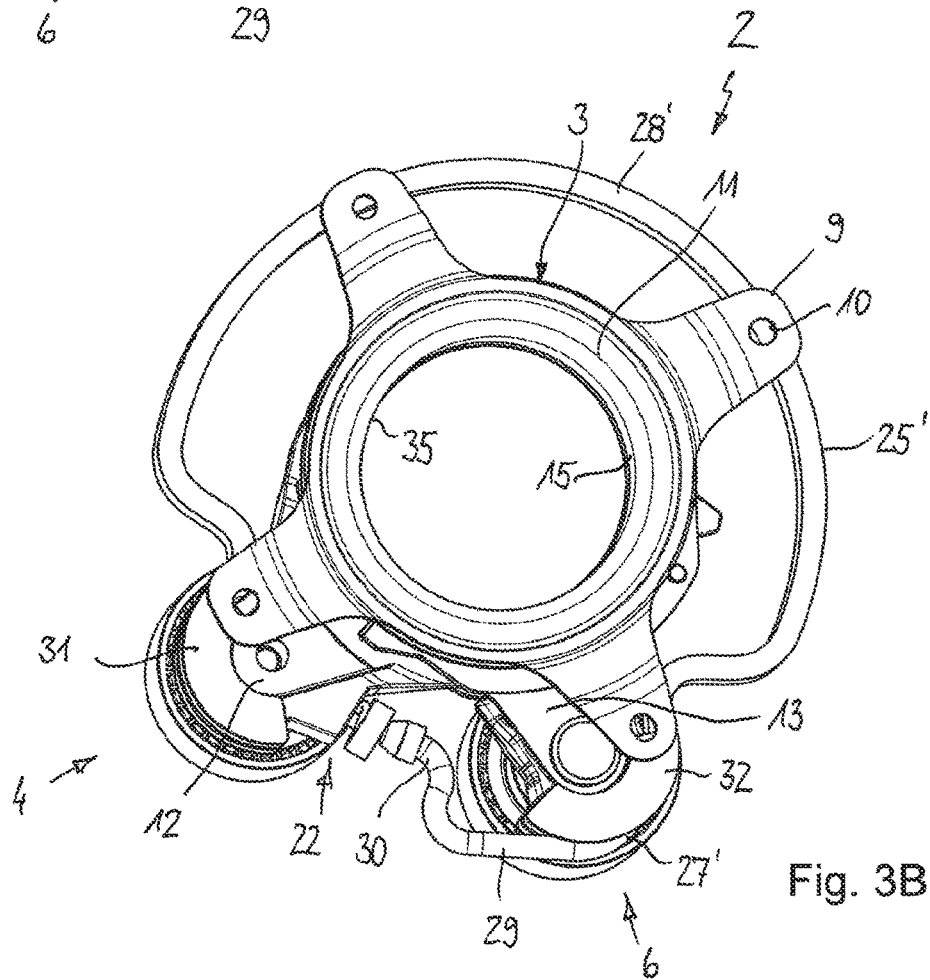
FIG. 3B: the belt tensioning device of FIG. 3A in a further perspective view from below.

FIGS. 3A and 3B show a tensioning device 2 in a further embodiment. The present embodiment widely corresponds, concerning structure and function, to the tensioning device of FIG. 1, to which description reference is thus made regarding common features. Thereby, the same or modified components are provided with the same reference numerals as in FIG. 1. Additionally, further details can be seen, such as the tensioning rollers 5, 7 mounted on the tensioning arms 4, 6 as well as discs 16, 16' preventing the penetration of dirt into the bearings of the tensioning rollers 5, 7.

A difference of the present embodiment of FIG. 3 lies in the design of the adjustment unit 22. The adjustment unit 22 comprises a support body 43 which is supported on a support element 23 and is adjustably connected thereto. The support body 43 is adjustable relative to the support element 23 by screw means that are not shown in detail. In this manner, the support face of the support body 43, on which the spring 25' is supported in the nominal operation, is adjustable in a circumferential direction, so that the activation point, at which the tensioning torque increases, can be correspondingly adjusted. Damping means 47 are provided at spring end 30, which are here designed in the form of a damping rubber. As the spring end 30 is provided with a damper, a striking of the spring end 30 against the support body 43, which thus works as abutment, is dampened and the occurrence of undesired noises is prevented.

A further smaller difference is the structure of the base member 3 and of the attachment means 9. The base member 3 is presently made as a sheet metal forming component, for example from sheet steel. Presently four attachment points 9 are provided along the circumference, wherein it will be understood that the number and design depend on the construction space conditions on the accessory.

FIGS. 4A to 4C show a belt tensioning device 2 in a further embodiment. The present belt tensioning device 2 widely corresponds in structure and function to the embodiment of FIGS. 3A to 3B, so that concerning common features reference is made to the above description. In this case the same modified components are provided with the same reference signs as in the above Figures.

A difference of the present embodiment according to FIG. 4 lies in the design of the adjustment unit 22, in which the adjustment unit 22 is not arranged on the first tensioning arm, but in a circumferential region of the free spring portion 28' between the two tensioning rollers 5, 7. The adjustment unit 22 comprises a support body 43, against which the spring 25' is radially and axially supported, as well as a carrier element 23, which is rigidly connected to one of the tensioning arms 4, 6, in particular to the second tensioning arm 6. The support body 43 is formed in the shape of an adjustable bearing shell and is radially adjustable relative to the carrier element 23. For this, the support body 43 has an elongated hole, through which a screw 45 is insertable and screwable to the carrier element 23. The free spring end 30 of the second spring 25' is directly supported on the first tensioning arm 4 in a circumferential direction. On the carrier element 12 of the first tensioning arm 4 a trough-shaped support face 46 is provided, into which the spring end 30 can enter and abut the same. The spring end 30 is bent in an axial direction, without being restricted thereto.

Figure 5A:
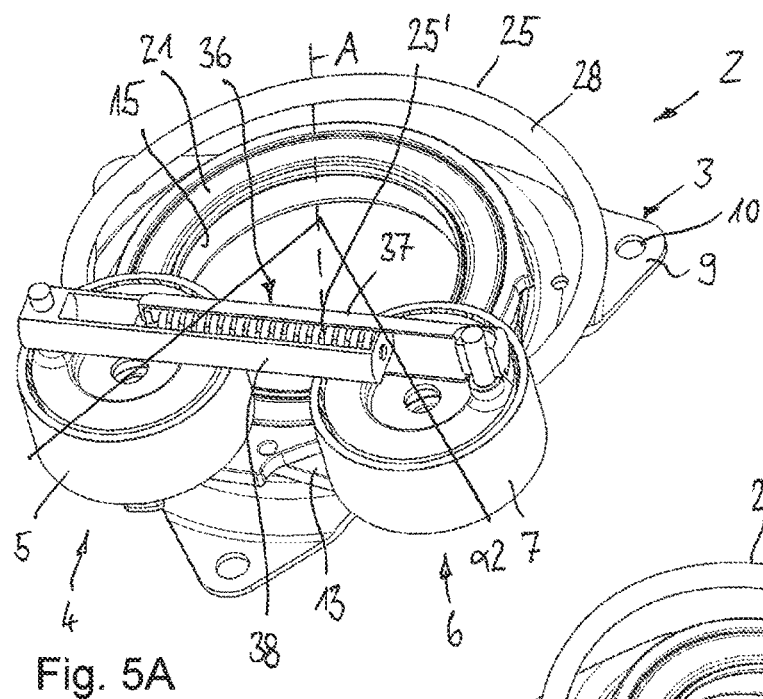
FIG. 5A: a belt tensioning device in a further embodiment, with a partially cut spring unit in a perspective view from semi-oblique front in an angle position in which the second spring is activated.
Figure 5B:
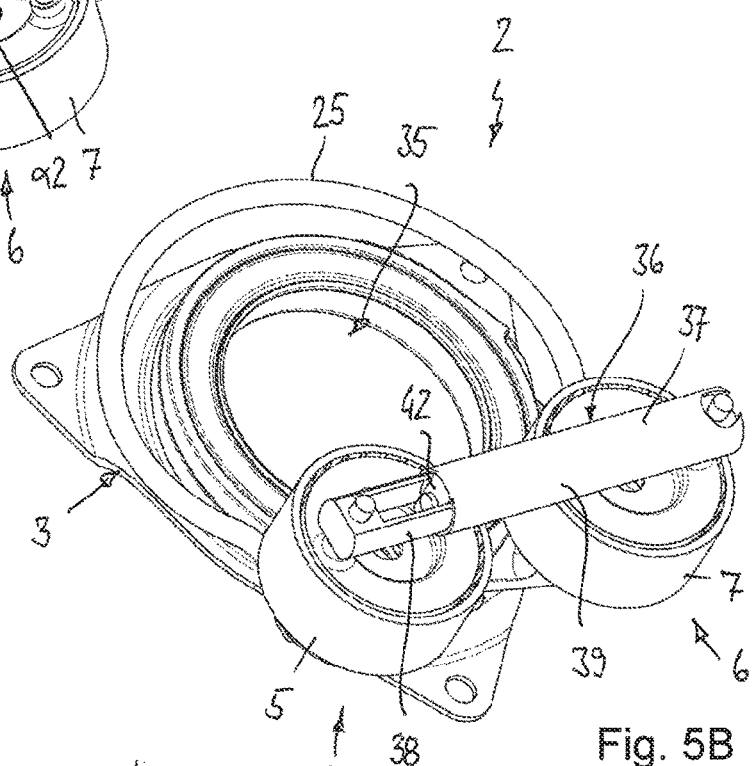
FIG. 5B: the belt tensioning device of FIG. 5A in a further perspective view.
Figure 5C:
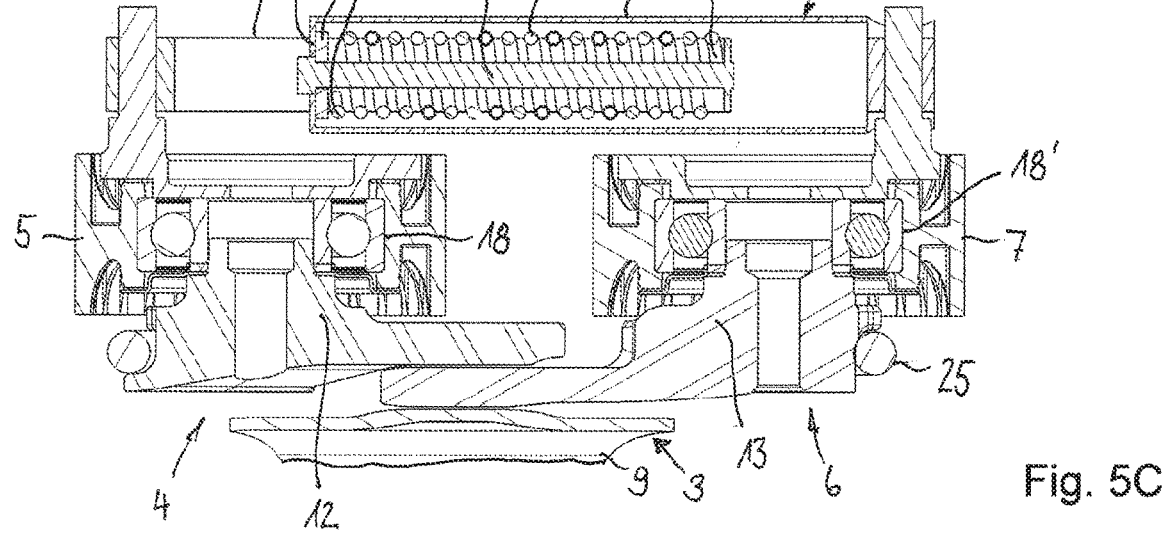
FIG. 5C: the belt tensioning device of FIGS. 5A and 5B in a longitudinal sectional view through the axes of rotation of the tensioning rollers.

FIG. 5A to 5C show a belt tensioning device 2 in a further embodiment. The present belt tensioning device 2 corresponds concerning structure and function in large parts to the embodiment of FIG. 3A to 3B, so that reference is made to the above description with regard to the common features. The same or modified components are provided with the same reference signs as in the Figures above.

A difference is that the second spring 25' is not designed in the form of a bow spring surrounding the opening 35, but is designed as part of a telescopic spring unit 36, which is arranged to be effective between the two tensioning arms 4, 6. The telescopic spring unit 36 comprises a telescopic retainer 37 with a first part 38 and a second part 39, which are movable relative to each other. In this case, a first end 26' of the second spring 25' is axially supported on the first part 38 of the telescopic retainer 37 and the opposite second end 27' of the second spring 25' is axially supportable on the second part 39 of the telescopic retainer 37. The first part 38 of the telescopic retainer 37 is pivotably supported on the first tensioning arm 4, while the second part 39 is pivotably supported on the second tensioning arm 6. When pivoting the two tensioning arms 4,6 relative to each other, the two parts 38, 39 move relative to each other, so that the length of the telescopic retainer 37 is changed.

The spring 25' is installed in the retainer 37 with preload in such a way that in a first telescoping travel range, which corresponds to the first pivot angle range ($\alpha<\alpha2$) of the tensioning arms 4, 6, the spring 25' is force-free with regard to a support of the two tensioning arms 4, 6, and in a second telescoping travel range, which corresponds to the second pivot angle range ($\alpha>\alpha2$) of the tensioning arms 4, 6, is further loaded from the pretensioned position, so that the second spring 25' exerts a spring force between the two tensioning arms 4, 6. The second spring 25' is in this example formed as a helical spring. The first retaining part 38 comprises a guide element 40, on which the second spring 25' is arranged, as well as a support plate 41, which is guided axially movably on the guide element 40 and against which the second spring end 27' is axially supported. The second retaining element 39 has an engagement face 42 which, when the two retaining elements 38, 39 are moved away from each other, interacts with the support plate 41 and carries this along. In this manner the second spring 25' is shortened, so that an additional tensioning force and, respectively, an additional tensioning torque M2 acts on the tensioning arms 4, 6.

As explained above, the disclosed tensioning devices 2 can be connected to an accessory of a belt drive, for example to a generator. Such an accessory usually comprises a drive belt pulley, which can be driven by an endless belt and/or can drive same. The base member 3 or the tensioning device 2 is formed in particular such that—in the mounted condition of the tensioning device 2 on the accessory—the pivot axis A of the tensioning arms 4, 6 is arranged within the outer diameter of the drive shaft, preferably essentially coaxially to the drive axis of rotation.

An advantage of all the embodiments described above is that the nominal tensioning force of the tensioning device 2 can be designed to be as small as possible. In normal operation, only the first spring 25 is active between the two tensioning arms 4, 6 to load these against each other, while the second spring 25' exerts no force between the two tensioning arms 4, 6. Only during larger tensioning angles, which can occur in special driving conditions, such as when an electric drive is switched on (boost mode) or mechanical energy is recovered or regenerated into electrical energy, the second spring 25' becomes effective and generates an additional tensioning force, respectively tensioning torque between the two tensioning arms 4, 6. Thus, a step-wise adjustable pendulum arm tensioner 2 is provided for an angle-dependent increase of the strand force in auxiliary unit drives.

LIST OF REFERENCE NUMBERS 2 belt tensioning device
3 base member
4 first tensioning arm
5 first tensioning roller
6 second tensioning arm
7 second tensioning roller
8 spring arrangement
9 attachment portion
10 bore
11 annular portion
12 carrier portion
13 carrier portion
14 screw
15 sleeve portion
16 disc
17 intermediate element
18 bearing
19 annular portion
20 annular portion
21 annular disc
22 adjustment means
23 sleeve body
24 adjustment element
25, 25' spring
26, 26' support portion
27, 27' support portion
28, 28' spring portion
29 guide portion
30 spring end
31 support element 32 support element
33 bore
34 bore
35 opening
36 telescopic spring unit
37 retainer
38 first part
39 second part
40 guide element
41 support plate
42 engagement surface
43 support body
44 locking nut
45 screw
46 support face
47 damping means
A axis

The invention claimed is:

1. A tensioning device for tensioning a traction mechanism of a belt drive, comprising:
a base member;
a first tensioning arm, pivotably supported on the base member and carrying a first tensioning roller;
a second tensioning arm, pivotably supported on the base member and carrying a second tensioning roller;
a spring arrangement with a first spring and a second spring arranged to be effective between the first and the second tensioning arm;
wherein the two tensioning arms, when pivoted relative to each other within a first tensioning angle range, are force-loaded against each other by the first spring, wherein the second spring is force-free relative to at least one of the two tensioning arms; and
wherein the two tensioning arms, when pivoted relative to each other within a second tensioning angle range comprising larger tensioning angles than the first tensioning angle range, are force-loaded against each other by the first spring and additionally by the second spring.

2. The tensioning device according to claim 1,
wherein the second spring is supported with a first spring end against the first tensioning arm in a first rotational direction;
wherein the second spring at tensioning angles within the first tensioning angle range is supported with a second spring end in the opposite second rotational direction against the first tensioning arm; and
wherein the second spring in the second tensioning angle range is support-free relative to the first tensioning arm and is supported against the second tensioning arm in the second rotational direction.

3. The tensioning device according to claim 1,
wherein a first tensioning angle is formed within the first tensioning angle range in a balanced position between the first tensioning arm and the second tensioning arm; and
wherein a second tensioning angle is formed between the first tensioning angle range and the second tensioning angle range, at which second tensioning angle a resulting spring force acting on the tensioning arms increases abruptly.

4. The tensioning device according to claim 3, wherein the second tensioning angle is smaller than the sum of the first tensioning angle plus 20°.

5. The tensioning device according to claim 1, wherein the second spring is mounted with a preload.

6. The tensioning device according to claim 3,
wherein the first spring, at the largest tensioning angle of the first tensioning angle range, generates a first spring force between the two tensioning arms; and
wherein the second spring, at the smallest tensioning angle of the second tensioning angle range, generates a second spring force between the two tensioning arms that is larger than a third of the first spring force.

7. The tensioning device according to claim 3, wherein adjustment means are provided for adjusting the first tensioning angle range.

8. The tensioning device according to claim 3, wherein the second spring has a guiding portion formed between the second spring end and the second support portion, by which guiding portion the second spring is axially supported and guided relative to a support element of the second tensioning arm when the two tensioning arms are pivoted within the first tensioning angle range.

9. The tensioning device according to claim 1, further comprising a damper arranged to dampen an abutment movement of the second spring end of the second spring against the first tensioning arm.

10. The tensioning device according to claim 1, wherein the second spring is accommodated in a telescope-retainer, wherein a first end of the telescope-retainer is pivotably supported on the first tensioning arm and a second end of the telescope-retainer is pivotably supported on the second tensioning arm.

11. The tensioning device according to claim 10,
wherein the telescope-retainer comprises a first part and a second part, which are telescopic relative to each other; and
wherein a first end of the second spring is axially supported against the first part of the telescope-retainer and a second end of the second spring is axially supportable against the second part of the telescope-retainer.

12. The tensioning device according to claim 1,
wherein at least the first spring has a first support portion, which is supported on the first tensioning arm, and a second support portion, which is at least supportable on the second tensioning arm, as well as a curved spring portion extending between the first support portion and the second support portion.

13. The tensioning device according to claim 1, wherein at least the first spring is formed as a bow spring having a circumferential extension of less than 360° around a pivot axis of the tensioning arms.

14. The tensioning device according to claim 1, wherein the base member has an opening formed such that at least one of a drive shaft and drive belt pulley of an accessory can extend into the opening in a contact-free manner.

15. The tensioning device according to claim 1,
wherein the tensioning rollers form a tensioning roller center plane perpendicular to roller axes of the tensioning rollers, and a bearing of the tensioning arms forms a bearing center plane perpendicular to the pivot axis;
wherein the tensioning roller center plane and the attachment attaching the base member are arranged on different sides of the bearing center plane.

* * * * *